(12) United States Patent
Spence et al.

(10) Patent No.: US 8,439,120 B2
(45) Date of Patent: May 14, 2013

(54) METHOD OF SEALING ANNULAR SPACE BETWEEN INNER AND OUTER UPRIGHT TUBES

(76) Inventors: Dean Spence, Sylvan Lake (CA); Gord Blomgren, Red Deer (CA); Randy Riske, Lacombe (CA)

( * ) Notice: Subject to any disclaimer, the term of this patent is extended or adjusted under 35 U.S.C. 154(b) by 553 days.

(21) Appl. No.: 12/629,578

(22) Filed: Dec. 2, 2009

(65) Prior Publication Data
US 2011/0127045 A1 Jun. 2, 2011

(51) Int. Cl.
| E21B 19/00 | (2006.01) |
| E21B 17/10 | (2006.01) |
| E21B 33/00 | (2006.01) |
| F16L 21/02 | (2006.01) |

(52) U.S. Cl.
USPC ......... 166/379; 166/85.3; 166/88.1; 277/314; 277/323

(58) Field of Classification Search .................. 166/285, 166/379, 84.1, 85.3, 88.1; 277/314, 132, 277/322, 328, 323; 29/898.11, 888.3, 402.02; 264/159, 150
See application file for complete search history.

(56) References Cited

U.S. PATENT DOCUMENTS

| 1,776,797 A * | 9/1930 | Sheldon ......................... 277/329 |
| 2,646,595 A * | 7/1953 | Leistensnider ............... 264/175 |
| 2,945,263 A * | 7/1960 | Leistensnider ............... 264/159 |
| 3,271,039 A * | 9/1966 | Kohl et al. ...................... 277/652 |
| 3,916,502 A * | 11/1975 | Bagnulo ..................... 29/890.14 |
| 4,178,003 A * | 12/1979 | Hobson .......................... 277/644 |
| 4,323,526 A * | 4/1982 | Hilbush, III ............... 264/36.16 |
| 4,530,397 A * | 7/1985 | Calhoun ....................... 166/84.2 |
| 4,755,244 A * | 7/1988 | Allison .......................... 156/158 |
| 6,165,402 A * | 12/2000 | Gabbard et al. .............. 264/255 |
| 7,270,183 B2 * | 9/2007 | Bour et al. ...................... 166/291 |
| 2002/0069962 A1* | 6/2002 | Maxwell et al. .............. 156/286 |

* cited by examiner

*Primary Examiner* — David Andrews
*Assistant Examiner* — Michael Wills, III
(74) *Attorney, Agent, or Firm* — Kyle R. Satterthwaite; Ryan W. Dupuis; Ade & Company Inc.

(57) ABSTRACT

A method of sealing annular space between an upright outer tube and an upright inner tube extending within the outer tube along an axial direction thereof involves pouring a liquid seal material into the annular space onto a support member fitted within the annular space between the outer tube and the inner tube in a manner substantially closing around the inner tube. The liquid seal material is poured in an amount sufficient to fill radial space between the inner tube and the outer tube fully around the inner tube, the liquid seal material is then cured to form an annular seal between the inner tube and the outer tube. The method is useful in sealing of the annular spacing between the surface and production casing of a gas well and installing a venting system to facilitate controlled venting of the annular space.

20 Claims, 3 Drawing Sheets

METHOD OF SEALING ANNULAR SPACE BETWEEN INNER AND OUTER UPRIGHT TUBES

FIELD OF THE INVENTION

The invention relates generally to a method of sealing annular space between an upright outer tube and an upright inner tube extending within the outer tube along an axial direction thereof, and more particularly to sealing such annular space between the surface and production casing of a gas producing well.

BACKGROUND OF THE INVENTION

With rising environmental concerns, more attention than ever is being paid to the issue of surface casing vent flow in gas producing wells.

In a natural gas well, the subterranean gas is to be produced by flowing upward to the surface through the production casing of the well. Surface casing vent flow refers to movement of gas upward around the outside of the production casing and discharging into the atmosphere around the wellhead through an annular space between the production casing and the larger diameter surface casing that closes around the production casing from the ground surface downward over an upper portion of the production casing's height to protect shallow ground water formations. If all of the natural gas is being produced upward through a leak-free production casing, then the surface casing vent flow should be zero. To ensure that this vent flow of gas to the atmosphere remains acceptably low so as to minimize the environmental effects of the well, surface casing vent flow tests are performed to monitor the vent flow and compare the measured data against a maximum acceptable value, such as that set by a regulatory agency.

For example, one vent flow test involves shutting-in the annular space between the surface and production casings with a pressure relief valve set according to a maximum allowable shut-in pressure, for example as dictated by a regulatory agency, and using a pressure gauge or pressure recorder to monitor the pressure of the shut-in casing over a shut-in period. If within this period the pressure stabilizes at a value below the pressure relief valve setting, then the surface casing vent flow is considered acceptable. If the pressure relief valve setting is reached, then the vent flow is above the acceptable maximum, then the test is failed and taken as an indication of a problem that will need to be addressed through further action. Finally, if the pressure did not stabilize, the test is repeated with a longer shut shut-in period.

In order to be able to perform these tests, a gas well can be provided with a venting system. The annular space between the surface and production casing is closed off in a sealed manner near the ground surface and tapped at a location beneath this seal, where a hole or port in the surface sealingly communicates the annular space with a vent line that has its opposing end disposed above ground to exhaust vent flow gas above ground. A valve on the vent line is used to control the release of vent flow gas by opening and closing the line's passage from the well's annular space to the vent line exhaust outlet above ground. Normally the valve is left open so that vent flow gas is released into the atmosphere instead of building up pressure within the well, as sufficient pressure build-up could lead to failure of the surface casing and resulting contamination of groundwater. When a surface casing vent flow test is to be performed to measure the shut-in pressure, the valve is then closed.

In order to prepare a well for these shut-in tests, it is accordingly necessary to seal the annular space between the surface casing and the production casing sealed at the wellhead.

One method used for forming a seal between the casings is to measure an axial offset between the surface casing and the production casing extending downward therethrough and then produce an annular rubber seal using these measurements. A cut is then made through the ring shaped seal to form a split therein, so that the split ring can be placed around the production casing at a position below the wellhead valve equipment from which it is suspended in use. The two ends of this split-ring are then adhesively reconnected so that the ring is once again complete and now closes fully around the production casing. Two halves of a clamping device are positioned above and below the ring and bolted together therethrough, so that tightening of the bolts will flatten out the rubber ring expanding it radially to seal tightly against the outer surface of the production casing and the inner surface of the surface casing. However, a potential problem with this solution is that the resulting seal may not be able to handle significant pressures that may be experienced during shut-in testing for surface casing vent flow.

Accordingly, there is a desire for other methods of forming a seal between the surface and production casing of a gas well, and such methods may also prove useful in other applications also requiring sealing of annular space between an outer casing or tube and a inner tube extending within the outer tube along an axial direction thereof.

SUMMARY OF THE INVENTION

According to a first aspect of the invention there is provided a method of sealing annular space between an upright outer tube and an upright inner tube extending within the outer tube along an axial direction thereof, the method comprising the steps of:

(a) pouring a liquid seal material into the annular space between the outer tube and the inner tube onto a support member fitted within the annular space between the outer tube and the inner tube in a manner substantially closing around the inner tube, the liquid seal material being poured in an amount sufficient to fill radial space between the inner tube and the outer tube fully around the inner tube; and (b) letting the liquid seal material set to form an annular seal between the inner tube and the outer tube.

The outer tube may be a surface casing installation of a well. The inner tube may be a production casing installation of the well. In these instances, before step (a), the method preferably comprises producing the support member on location at a well site.

Before step (a), the method may comprise measuring an axial offset between the inner tube and the outer tube, adjusting an offset between axes of two annular walls of an adjustable mold nested one inside another to match the axial offset measured between the inner tube and the outer tube and using the mold to form the support member.

Preferably the support member is formed on location at a site where the inner and outer tubes are located.

Preferably the support member comprises a foam body.

Preferably sloped top surfaces of the support member each slope downward toward a respective one of inner and outer peripheral surfaces of the support member from a position above and between the inner and outer peripheral surfaces.

Preferably the sloped top surfaces span only an incomplete portion of the distance between the inner and outer peripheral surfaces.

Preferably a central top surface between the sloped top surfaces is flat.

The method may include additional step (c) of covering the annular seal formed in step (b) with a backing member to increase a level of pressure bearable at the seal from below.

Step (c) preferably comprises producing the backing member on location at a site where the inner and outer tubes are located.

Step (c) preferably comprises pouring a backing material into the annular space between the outer tube and the inner tube onto the annular seal in an amount sufficient to fill radial space between the inner tube and the outer tube fully around the inner tube and letting the backing material set to form the backing member.

Preferably the backing material comprises a metal filled liquid epoxy.

The method may comprise installing a locking member over the cover member to help retain the cover member and the annular seal in place under exposure to pressure from below.

The locking member may comprise a clamp closing around the outer tube adjacent a top end thereof and projecting inward over the top end of the outer tube toward the inner tube to prevent upward movement of the cover member and the annular seal under exertion of pressure thereon from below.

The clamp may be formed by arcuate pieces, each spanning an incomplete portion of a circumference of the outer tube, fastened together to fully enclose around the outer tube adjacent the top end thereof.

The method may comprise forming a port in the outer tube at a position therealong below the annular seal and communicating the port with piping outside the outer tube to facilitate discharge of fluid from the annular space to a location outside the outer tube.

Where used in the context of a gas well, preferably the method includes forming a vent port in the surface casing installation at a position therealong below the annular seal and communicating the vent port with vent piping having an outlet disposed above ground surface. In this instance, preferably the vent piping is equipped with a valve operable to control venting of gas from the annular space.

According to a second aspect of the invention there is provided a method of sealing annular space between an upright outer tube and an upright inner tube extending within the outer tube along an axial direction thereof, the method comprising the steps of:

(a) producing a support member dimensioned to fit in the annular space between the outer tube and the inner tube in a manner substantially closing around the inner tube;

(b) positioning the support member within the annular space in a position substantially closing around the inner tube;

(c) pouring a liquid seal material into the annular space between the outer tube and the inner tube onto the support member in an amount sufficient to fill radial space between the inner tube and the outer tube fully around the inner tube; and (d) letting the liquid seal material set to form an annular seal between the inner tube and the outer tube.

BRIEF DESCRIPTION OF THE DRAWINGS

In the accompanying drawings, which illustrate an exemplary embodiment of the present invention.

DETAILED DESCRIPTION

Figure 1:
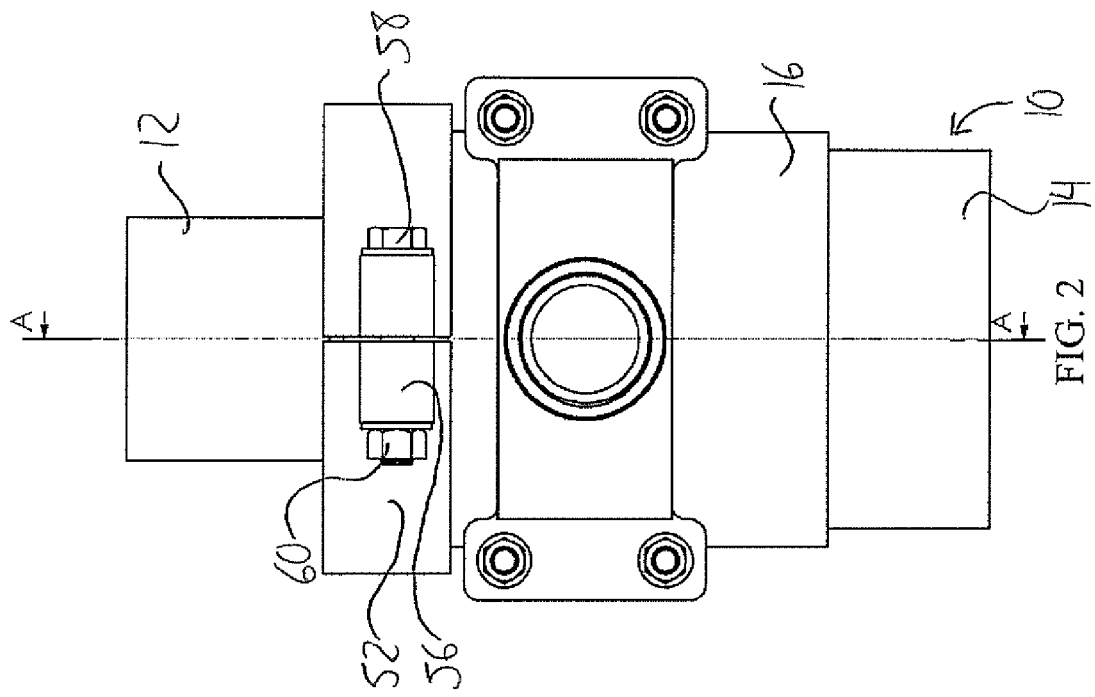
FIG. 1 is a perspective view of a length of surface casing having a length of production casing passing through it, with an annular space between the two casings having been sealed and vented according to the present invention.
Figure 2:
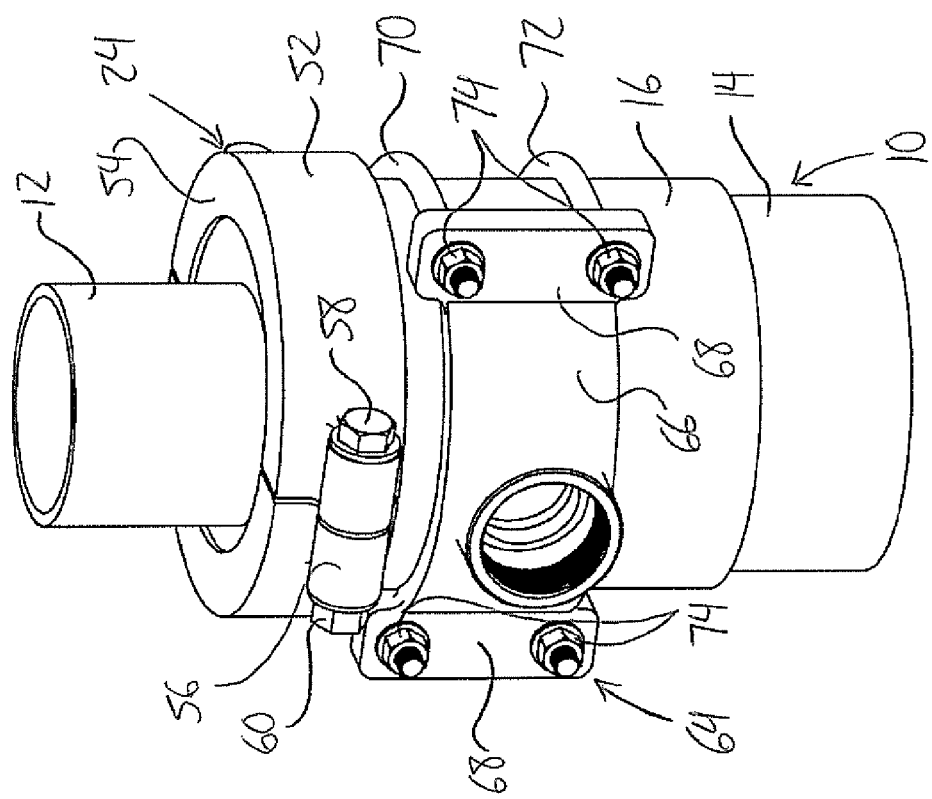
FIG. 2 is an elevational view of the surface and production casings of FIG. 1.
Figure 3:
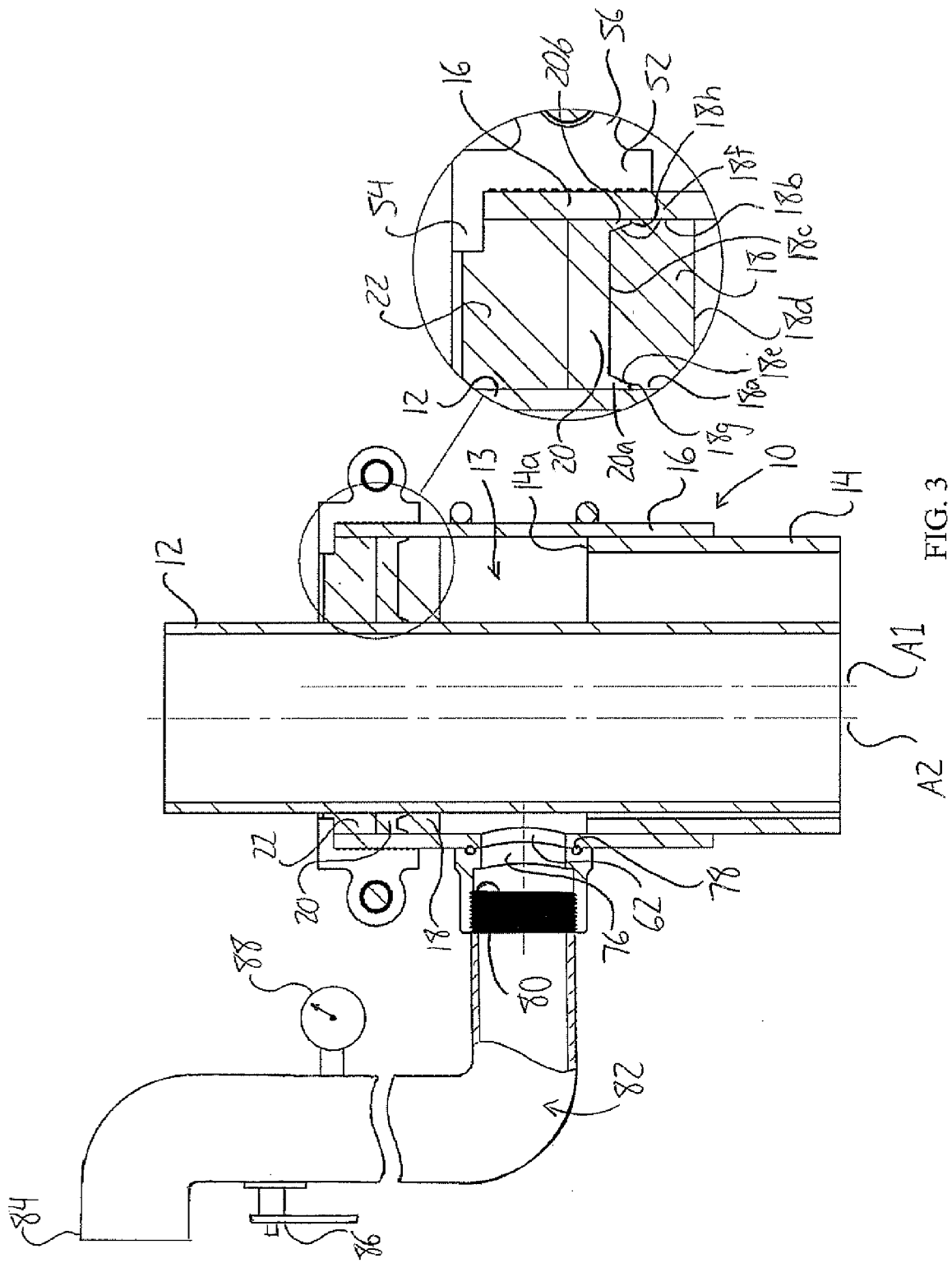
FIG. 3 is a cross sectional view of the surface and production casings of FIG. 2 as taken along line A-A thereof having been coupled to a schematically illustrated gas venting system.

FIGS. 1 to 3 illustrate a completed installation of a seal between a surface casing installation 10 and production casing installation 12 at a well head of a gas well in accordance with a method of the present invention. In a conventional manner, the production casing installation 12 passes vertically downward through the vertically oriented surface casing installation 10 that depends downward from ground level at an upper end of the well. In the figures, only a partial portion of the surface casing installation 10 is shown, specifically an upper end of an uppermost surface casing section 14 externally threaded at both ends and an internally threaded casing collar 16 fastened to this upper end 14a of the surface casing section 14 by engagement of the mating threads. The resulting structure is that the surface casing collar 16 closes coaxially around and projects upward from the top end of the uppermost surface casing section 14 and the production casing 12 passes vertically through these coaxially fastened collar and casing members defining the topmost assembly of the surface casing along the axial direction of the surface casing so as to pass through the top and bottom ends thereof. In this conventional well construction, the production casing 12 provides a pathway up to the surface for gases entering the wellbore, while the surface casing assembly closing around the upper extent of the production casing prevents any gas flowing upward outside the production casing in the annular space 13 between the production and surface casing from entering ground water or shallow water formations.

The present invention relates to a method of closing the annular space between the outer tubular structure formed by the surface casing installation 10 and the inner tubular structure defined by the production casing installation 12. FIG. 3 shows the final result of the method described herein below, specifically the closing off of the annular space between the casing installations adjacent the very top end of the surface casing installation 10, as defined by the top end of the topmost surface casing collar 16. The described method further extends to addition of a vent port added by forming a throughhole in the surface casing collar 16 so that piping of a vent system can be communicated with the annular space between the now-sealed top end thereof. The vent system accordingly allows surface casing vent flow gas moving upward in the annular space to continue to normally vent to the atmosphere from an above-ground location, while allowing quick and easy closing off of this only exit point for the surface casing vent flow using a valve on the vent piping between the surface casing vent port and the above-ground exhaust outlet of the vent piping to facilitate execution of shut-in pressure tests for monitoring of vent flow conditions.

With reference to FIG. 3, the closure at the top end of the surface casing installation 10 features three members layered in a vertical stack occupying the annular space 13 between the casing installations, specifically a bottom support member 18, a middle sealing member 20 and a top covering member 22. A clamp device 24 is engaged over and around the top end of the surface casing installation to help retain these closure elements in place within the surface casing collar 16, holding them down inside the surface casing collar 16 against pressure exerted by gases below the closure in the annular space.

To form this three layered closure, the method of sealing the annular space begins with producing and installing the support member 18. First, if not already known, a determination of an axial offset value between the surface casing installation 10 and the production casing installation 12 is made by measuring spatial relationships between them to determine a radial distance from the central axis A1 of the surface casing installation 10 to the central axis A2 of the production casing installation 12. This value is then used in setting up of an adjustable mold, as shown in FIGS. 4 to 6, for production of a support member suitably dimensioned for fitting snugly within the annular space between the surfacing casing collar 16 and the production casing 12 at a height near, but spaced downward from, the top end thereof.

Figure 4:
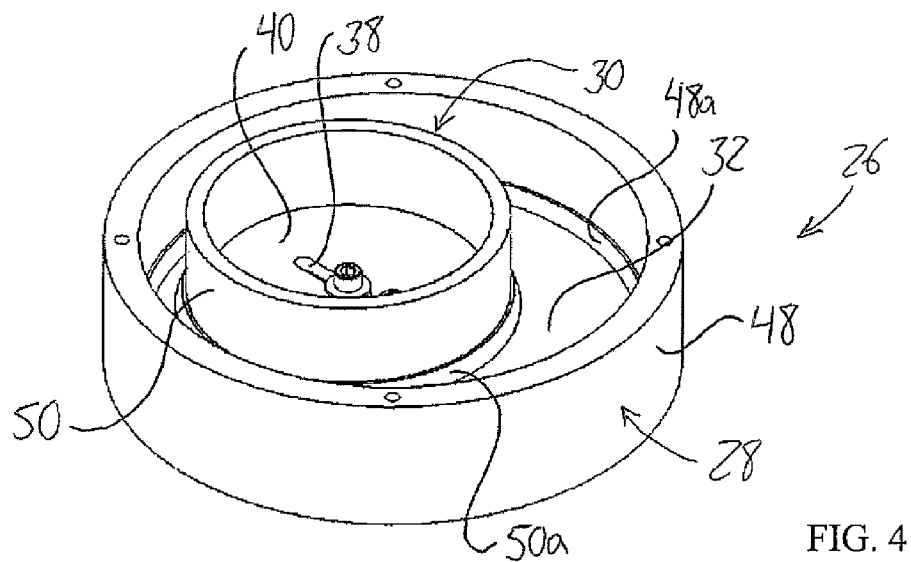
FIG. 4 is a perspective view of an adjustable mold used in the production of the seal between the surface and production casings of FIGS. 1 to 3.
Figure 5:
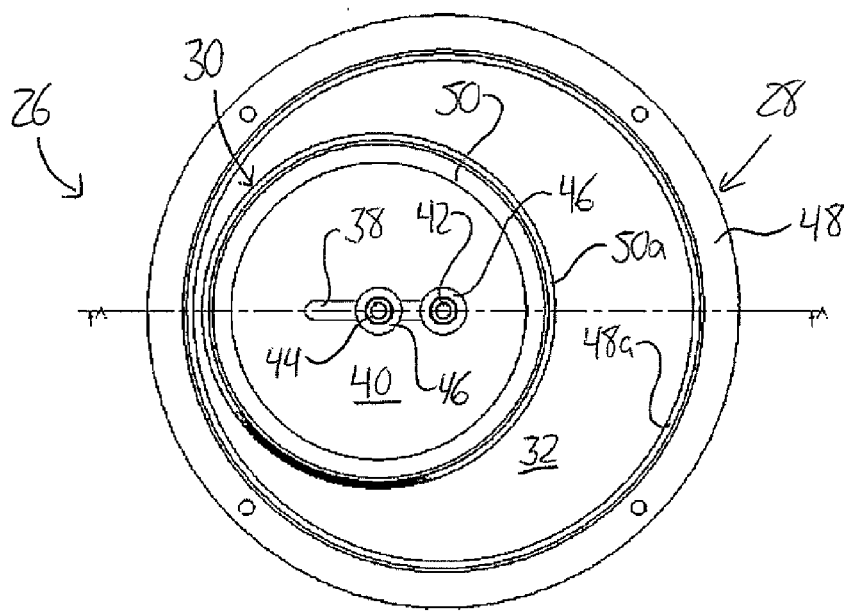
FIG. 5 is an overhead plan view of the adjustable mold of FIG. 4.
Figure 6:
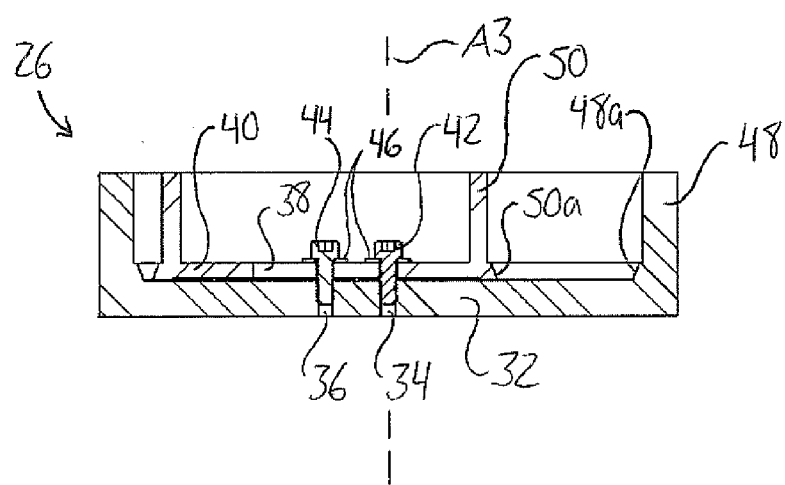
FIG. 6 is a side elevational view of the adjustable mold of FIGS. 4 and 5.

Referring to FIGS. 4 to 6, the mold 26 features two closed-bottom, open-top hollow parts 28, 30 of generally cylindrical shape closing around respective vertical axes. The larger of these two parts 28 has a main inner diameter equal or nearly equal to that of the well's surface casing collar 16, while the smaller of the two parts 30 has a main outer diameter equal or nearly equal to that of the section of production casing passing through the top end of the surface casing collar 16. The smaller part 30 nests within the larger part 28, sitting atop the flat horizontal bottom 32 thereof. With reference to FIG. 6, a pair of threaded holes extend into the bottom 32 of the larger part, one hole 34 at the center of the circular bottom 32 and another hole 36 at a radial distance outward therefrom at a position between the bottom's center and the annular wall of the part 28. A linear slot 38 passes through the flat horizontal bottom 40 of the smaller part 30 with the lengthwise center of the slot 36 lying on the center point of the part's circular bottom 40 so as to extend equal radial distances therefrom in opposite directions.

Two threaded fasteners 42, 44 are respectively threaded into the central hole 34 and radially outward hole 36 in the bottom 32 of the larger part 28 through the slot 38 in the bottom 40 of the smaller part 30. As shown, each threaded fastener 42, 44 may pass through a respective washer 46 of greater diameter than the width of the slot atop the smaller part's bottom 40. When the fasteners are sufficiently loose, the smaller part 30 can be slid back and forth along the diameter of the larger part 28 on which the holes 34, 36 therein lie to adjust the offset between the vertical axes of the two parts to match the measured axial offset of the well's surface and production casing. In the illustrated embodiment, the center to center spacing of the equal-diameter fastening holes in the larger part plus one radius of either hole (i.e. the distance from the center of one hole to the far side of the other hole) is half of the slot's length so that displacing the smaller part to bring the central fastener 42 against the respective end of the slot 38 will put the smaller part in a maximum offset position from the axis of the larger part, while displacing the smaller part in the opposite direction to bring the radially outward fastener 44 against the opposite end of the slot 38 will put the smaller part in a central position concentric with the larger part. Once the position of the smaller part 30 within the larger part 28 has been set to accomplish the same offset value as between the well's production and surface casings, the threaded fasteners 42, 44 are then tightened so that the heads of the fasteners clamp the smaller part atop the larger part's bottom to lock the two parts together in this relative positioning to one another. The adjustable mold is then ready to use for production of the support member.

As shown in FIG. 6, the height of the smaller part 30 reaches the top of the larger part 28 when clamped in place atop the bottom 32 thereof. Each of the hollow closed-bottom parts of the mold is generally cylindrical, except for a small deviation from the otherwise uniform cross-section of the part's annular peripheral wall at or adjacent the bottom wall of the part. The inner surface of the larger part's annular peripheral wall 48 is vertically cylindrical over most of the wall's height from the top of the wall downward, but then juts a short distance horizontally inward toward the central vertical axis A3 of the part and then slopes obliquely downward and inward toward this central vertical axis around which the part's peripheral wall 48 concentrically closes before joining with the top surface of the part's bottom wall 32. This sloped portion 48a of the larger peripheral wall's inner surface is most clearly visible in the radial cross-section of FIG. 6. The outer surface of the smaller part's annular peripheral wall 50 is vertically cylindrical over most of the wall's height from the top of the wall downward, but then juts a short distance horizontally outward toward the surrounding peripheral wall 48 of the larger part 28 at the same elevation as the top surface of the part's flat horizontal bottom 40 and then slopes obliquely downward and outward toward the outer wall 48 of the mold before meeting with the bottom surface of the smaller part's circular bottom wall 40 at an acute angle. This sloped portion 50a of the smaller peripheral wall's outer surface is most clearly visible in FIGS. 4 and 6.

With the mold adjusted and locked, a pourable liquid urethane foam is poured into the annular space between the outer wall surface of the mold's smaller part 30 and the inner wall surface of the mold's outer wall surface, and then allowed to cure or set to form the flexible support member 18 that is to afterward be placed between the surface and production casing installations of the gas well as the first layer of the top closure for the annular space at the wellhead. Comparing FIGS. 3 and 6, it can be seen that the urethane foam support member or gasket 18 is used in an inverted orientation from that in which it was produced in the adjustable mold 26. That is, as a result of the jutting and sloped portions of the mold's peripheral walls, the resulting annular support member 18, when installed in the well as shown in FIG. 3, has vertical inner and outer peripheral surfaces 18a, 18b and horizontal top and bottom surfaces 18c, 18d. The top horizontal surface 18c is shorter than the bottom horizontal surface 18d and sloped surfaces 18e, 18f slope downward and outward away from the top horizontal surface 18c at opposite ends thereof to connect to respective ones of the peripheral surfaces 18a, 18b by way of horizontal shoulders 18g, 18h extending further outward from the top horizontal surface at a distance downward therefrom.

Produced using the mold, the support member 18 originally has an annular closed-ring structure. To allow installation of the support member 18 in the annular space at the wellhead, the support member 18 is accordingly cut to form a break or split in the ring so that the ring can be opened to pass the two ends of the support member formed by this splitting or cutting past the production casing from one side thereof to engage thereabout at a position below the where the production is suspended on the wellhead and above the surface casing collar. So positioned to substantially close around the production casing at a position above the surface casing installation, the split support member 18 is then forced down along the production casing into the annular space between the production and surface casing to a position upward from the top end of the uppermost surface casing section 14 but downward from the top end of the surface casing collar 16.

Now in place to fill the annular space by closing around the production casing and spanning the radial distance from the outer surface of the production casing to the inner surface of the surface casing, the support member forms a gasket onto which a pour-in-place sealing material can be distributed to and then allowed to set or cure to form a gas impervious sealing layer directly atop the support layer defined by the foam support member. For example, a pour-in-place two part polyurethane rubber material is poured into the annular space, through an open top end thereof, onto the support member 18 and then allowed to sit undisturbed to set or cure in place. With reference to FIG. 3, the recesses left depending downward from the top surface 18c of the annular support member 18 at the engagement of the support member against the surface casing collar 16 and the production casing 12 by the support member's sloped surfaces and shoulders are filled by the liquid sealing material poured onto the support member 18, which continues to be poured so that the liquid further pools up to a height above the horizontal top surface 18c of the support member. The sealing material is allowed to set or cure in place between the well's surface and production casing and accordingly forms a rubber annular seal closing fully, continuously and integrally around the production casing, filling the full radial expanse of the annular space between the casing installations at all locations around their axes.

Having filled the annular recesses at the inner and outer peripheries of the support member 18, the rubber seal has downward depending inner and outer lips 20a, 20b extending fully around its inner and outer peripheries. The face of each lip facing the opposite lip corresponds to the sloped surface of the support member and according slopes upwardly toward the opposite lip. As a result, the cross-section of the annular seal 20 resembles a rectangle having had a shallow regular trapezoid of notably lesser height and slightly lesser width than the rectangle cut away from its bottom edge. Accordingly, the upward acting pressure exerted against the bottom of the seal from gases below the seal and the seal support member in the annular space will tend to force the inner and outer lips 20, 20b outwardly away from one another against the production casing and surface casing installations respectively, thereby better ensuring a complete and consistent seal therewith to better prevent any leaks through the top end of the annular spacing.

With the sealing layer of the annulus poured and set, the additional backing layer 22 atop the seal can then be added. This backing employs a stronger more rigid material than the sealing and supporting layers below it in order to give the closure of the annular space greater pressure handling capability by reinforcing the flat top of the seal. Like the seal 18, the backing layer of the preferred embodiment is produced on site using pour-in-place techniques to provide the best dimensional fit to fully span the radial dimensions of the annulus between the casing installations and provide a continuous, single integral body closing fully around the production tubing with no breaks or weakened areas. An example of a suitable strength-providing backing material that can be poured in place is a two part structural metal filled epoxy. As shown in FIG. 3, the backing material is poured in an amount sufficient to fill up the remainder of the distance to the top end of the surface casing collar 16.

To complete the closure at the top of the annular space, a clamp device 24 is clamped to the outer peripheral surface of the collar 16 of the surface casing installation adjacent the top end thereof and projects radially inward a partial distance toward the surface casing central axis A1 so as to extend inwardly past the inner surface of the collar 16 over the top end thereof and thereby block attempted upward movement of the layers 18, 20, 22 of the annulus closure under exposure to significant pressure from below. A body of the clamp device is made up of two halves, each having an arcuate vertical wall 52 and an arcuate horizontal flange 54 projecting toward the center of the vertical wall's curvature at a top end of the wall 52. A lug 56 projects radially outwardly from each vertical wall 52 at each end thereof, presenting a horizontal bore through which a bolt 58 can be passed in a direction generally tangential to the wall's arcuate curvature at the end thereof. The clamp body halves are placed against the outer surface of the surface casing collar 16 from opposite sides thereof with their lug bores aligned in pairs so that one of the bolts 58 can be passed through each pair and fitted with a matingly threaded nut 60. Tightening of the nut and bolt combination pulls the two clamp body halves together, tightening them against the collar 16. The friction between the walls 52 of the clamp parts and the outer peripheral surface of the collar 16 retains the clamp in place, and the inner surfaces of the walls 52 may be grooved or threaded to improve the gripping action on the collar 16. With the two clamp halves coupled together, their flanges project inward partially over the backing layer of the closure at the open top end of the casing collar 16 to effectively lock the closure by blocking movement thereof upward out of the annular space. To achieve the illustrated result in FIG. 3, the clamp is installed before pouring of the backing layer so that that the resulting backing member fully fills the space between the seal 20 and the clamp flanges 54 to rest flush thereagainst.

To allow venting of gases from the annular space between the production and surface casing installations after the sealing the top end of this annular space, the casing collar 16 is tapped to produce a vent port or hole 62 through the collar 16 at a position below the closure of the annular space's top end and above the top end of the uppermost surface casing section 14. A service saddle 64 is fitted around the casing collar 16 to provide a sealed attachment point for connection of an inlet end of a vent system pipe to communicate the pipe with the annular spacing between the casing installations so that the outlet end of the pipe can release gas from this annular spacing at a point above ground outside the well and test personnel can use valve equipment on the vent piping to control venting of the annular space as may be required.

The service saddle features an arcuate band 66 having a curvature following that of the round cylindrical shape of the casing saddle's outer peripheral surface and spanning less than half of the circumference thereof. Two flange plates 68 are fixed to the band 66 at the opposite ends thereof and extend along a vertical plane containing a chord interconnecting the horizontal arcuate path the band follows. Each vertical flange plate 68 has two holes passing therethrough, one directly over the other. A top U-bolt 70 has its ends passed through the top holes in the two flange plates 68 so that its closed curved end wraps about the side of the casing collar 16 opposite a side thereof against which the arcuate band 66 is placed to position the band's concave face against the convex outer surface of the casing collar 16. A bottom U-bolt 72 likewise has its ends passed through the bottom holes in the two flange plates 68. A nut 74 is threaded onto each end of each U-bolt and tightened. Tightening the nuts 74 brings the closed ends of the U-bolts closer to the band 66 by drawing the threaded ends of the U-bolts through the holes in the flange plates, reducing the size of the space bound between the U-bolts and the flanged band 66 to tighten the U-bolts and band around the casing collar 16.

A hole 76 through the band 66 is aligned with the vent port 62 in the casing collar 16 before the U-bolts are tightened and is the same size as the vent port. An o-ring 78 is partially recessed into the concave face of the band 66 around the hole 76 therein so that under tightening of the saddle, the o-ring will seal between this inner surface of the band 66 and the outer surface of the casing collar around the communicating vent port 62 and saddle hole 76. A short cylindrical passage 80 fixed to the outer face of the band 66 communicates with the hole 76 in the band and the vent port 78 sealed thereto, and has an internally threaded structure resembling or formed by half of a conventional threaded pipe coupling. According, connecting a vent pipe to this pipe coupling will communicate the vent pipe with the annular space between the well's surface and production casing installations through the internal passage or bore of the pipe coupling, the hole in the band and the vent port in the casing collar. The vent system pipework 82 coupled to the service saddle can be configured to first project radially away from the surface casing installation and then extend upward to a location over ground surface where an outlet end 84 of the pipe can release vent flow gas to the atmosphere and where appropriate valve and measurement equipment, such as a closure valve 86 and pressure gauge 88, can be employed on the vent piping to allow control over venting to the atmosphere, surface casing vent flow testing or other activities where control or measurement of conditions in the annular space between the surface and production casings may be required or useful. For the context in which the method and devices have been described for use, the service saddle and locking clamp preferably employ steel components.

Seals produced using the principles of the present invention have been tested and found to provide pressure retention up to 1500 psi. In addition, the methods and devices described above allow for complete on-site production of the wellhead seal. In the prior art, someone must first be deployed to the well site to measure an offset between the production and surface casing axes in order to then produce an accordingly dimensioned seal at a manufacturing facility remote from the eventual installation site. In the above described method where the support member can be open-air molded on location at the well site immediately after taking the offset measurement, the seal is formed using a pour-in-place procedure and any backing layer is likewise simply poured atop the seal once set or cured, the entire task can be completed in one trip to the well site. This saves time and money as an oil company does not need to send someone out to first excavate the casing to make measurements in advance, and then have to return to the site at later date for installation as a result of having to wait for production and transport from wherever the sealing element is being manufactured.

The illustrated embodiment of the wellhead seal or closure formed in accordance with the present invention is shown and described in terms of having the closure disposed between the production casing and a surface casing collar installed atop the uppermost section of surface casing. However, not every well will having such a collar installed on the top end of the uppermost section of surface casing. From this it will be appreciated that the sealing closure may formed directly between a surface casing section itself and the production casing, rather than between the production casing and a collar coupled to such a surface casing section. Furthermore, although the illustrated embodiment is described in terms of producing a custom molded foam support member to be installed into the annular space for pouring of the initially-liquid seal material onto it, a different base or support structure may be employed. For example, in a well having an existing mechanical seal installed in the annular space, the closure provided by this mechanical seal may be further improved by forming an additional pour-in-place seal of the present invention over the existing seal, for example by pouring the liquid seal material directly onto the existing mechanical seal or onto a new support member, gasket or base first installed atop the existing mechanical seal during the seal-forming process of the present invention.

The methods and apparatuses presented herein above have been described within the particular context of sealing the annular space between surface and production casing installations of a gas well. However, it will be appreciated that other scenarios may similarly benefit the novel method for sealing off an annular space between a tubular structure extending internally and axially along an outer tubular structure. Depending on the context, communicating the annular spacing with a location outside the tubular structure, as achieved by the addition of a venting system in the foregoing description, may not be required. Some contexts may not required a backing layer or locking device to hold the seal in place depending on levels of pressure reasonably expected in such contexts. Additionally, the sealing operation described above is employed on an existing well where the size of the wellhead valve equipment mounted over the production casing prevents sliding of the support member onto the production casing from above to for sliding further downward into place in the annular space, and so the support member is instead first cut or split it to allow it to be wrapped around the production casing below where it hangs on the wellhead, but other contexts of sealing between pipes may not require such splitting of the support member and may allow it to be simply slid into place over a free end of the smaller tubular structure running along a larger tube closing around it. Furthermore, it will be appreciated that materials other than those presented in the detailed description above may be used while still employing the pour-in place aspect of the method and benefiting therefrom.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of sealing annular space between an upright outer tube and an upright inner tube extending within the outer tube along an axial direction thereof, the method comprising the steps of:
   (a) pouring a liquid seal material into the annular space between the outer tube and the inner tube onto a support member fitted within the annular space between the outer tube and the inner tube in a manner substantially closing around the inner tube, the liquid seal material being poured in an amount sufficient to fill radial space between the inner tube and the outer tube fully around the inner tube;
   (b) letting the liquid seal material cure in place within the annular space, thereby forming an annular seal between the inner tube and the outer tube; and
   (c) forming a port in the outer tube at a position therealong below the annular seal and communicating the port with piping outside the outer tube to facilitate discharge of fluid from the annular space to a location outside the outer tube.

2. The method of claim 1 wherein the outer tube is a surface casing installation of a well.

3. The method of claim 2 wherein the inner tube comprises a production casing installation of the well.

4. The method of claim 2 comprising, before step (a), producing the support member on location at a well site.

5. The method of claim 1 comprising, before step (a), measuring an axial offset between the inner tube and the outer tube, adjusting an offset between axes of two annular walls of an adjustable mold nested one inside another to match the axial offset measured between the inner tube and the outer tube and using the mold to form the support member.

6. The method of claim 5 wherein the support member is formed on location at a site where the inner and outer tubes are located.

7. The method of claim 1 wherein the support member comprises a foam body.

8. The method of claim 1 wherein sloped top surfaces of the support member each slope downward toward a respective one of inner and outer peripheral surfaces of the support member from a position above and between the inner and outer peripheral surfaces.

9. The method of claim 8 wherein the sloped top surfaces span only an incomplete portion of the distance between the inner and outer peripheral surfaces.

10. The method of claim 8 wherein a central top surface between the sloped top surfaces is flat.

11. The method of claim 1 further comprising additional step (c) of covering the annular seal formed in step (b) with a backing member to increase a level of pressure bearable at the seal from below.

12. The method of claim 11 wherein step (c) comprises producing the backing member on location at a site where the inner and outer tubes are located.

13. The method of claim 11 wherein step (c) comprises pouring a backing material into the annular space between the outer tube and the inner tube onto the annular seal in an amount sufficient to fill radial space between the inner tube and the outer tube fully around the inner tube and letting the backing material set to form the backing member.

14. The method of claim 13 wherein the backing material comprises a metal filled liquid epoxy.

15. The method of claim 11 further comprising installing a locking member over the backing member to help retain the backing member and the annular seal in place under exposure to pressure from below.

16. The method of claim 15 wherein the locking member comprises a clamp closing around the outer tube adjacent a top end thereof and projecting inward over the top end of the outer tube toward the inner tube to prevent upward movement of the backing member and the annular seal under exertion of pressure thereon from below.

17. The method of claim 16 wherein the clamp is formed by two halves, each spanning an incomplete portion of a circumference of the outer tube, fastened together to fully enclose around the outer tube adjacent the top end thereof.

18. The method of claim 2 wherein the piping has an outlet disposed above ground surface.

19. The method of claim 18 wherein the piping is equipped with a valve operable to control venting of gas from the annular space.

20. The method of claim 1 wherein step (a) comprises pouring the liquid seal material into the annular space through an open top end of the outer tube.

* * * * *